(12) United States Patent
Czyzewski et al.

(10) Patent No.: US 12,387,859 B2
(45) Date of Patent: Aug. 12, 2025

(54) CONDENSER BUSHING

(71) Applicant: Hitachi Energy Ltd, Zürich (CH)

(72) Inventors: Jan Czyzewski, Cracow (PL); Jedrzej Banaszczyk, Lodz (PL); Darren Tremelling, Apex, NC (US); Andrzej Rybak, Cracow (PL); Krzysztof Kasza, Cracow (PL); Lukasz Matysiak, Cracow (PL); Elio Perigo, Wendell, NC (US)

(73) Assignee: HITACHI ENERGY LTD

( * ) Notice: Subject to any disclaimer, the term of this patent is extended or adjusted under 35 U.S.C. 154(b) by 268 days.

(21) Appl. No.: 17/789,969

(22) PCT Filed: Dec. 22, 2020

(86) PCT No.: PCT/EP2020/087675
§ 371 (c)(1),
(2) Date: Jun. 29, 2022

(87) PCT Pub. No.: WO2021/136730
PCT Pub. Date: Jul. 8, 2021

(65) Prior Publication Data
US 2023/0041971 A1 Feb. 9, 2023

(30) Foreign Application Priority Data
Dec. 30, 2019 (EP) .................................. 19220097

(51) Int. Cl.
*H02G 15/072* (2006.01)
*H01B 17/58* (2006.01)
(Continued)

(52) U.S. Cl.
CPC .............. *H01B 17/583* (2013.01); *H01G 4/35* (2013.01); *H02G 15/072* (2013.01); *H01B 17/28* (2013.01); *H01G 4/32* (2013.01)

(58) Field of Classification Search
CPC ...... H01B 17/583; H01B 17/28; B33Y 80/00; H01G 4/35; H01G 4/40; H01G 4/32; H02G 15/072
See application file for complete search history.

(56) References Cited

U.S. PATENT DOCUMENTS 2,953,629 A * 9/1960 Lapp ...................... H01B 17/28
174/31 R
3,024,394 A * 3/1962 Salisbury ............... H01G 4/224
361/275.1
(Continued)

FOREIGN PATENT DOCUMENTS

CN 1144982 A 3/1997
CN 101253582 A 8/2008
(Continued)

OTHER PUBLICATIONS

English Translation WO8000762; Mcconnel et al. Published Apr. 17, 1980 (Year: 1980).*
(Continued)

*Primary Examiner* — Steven T Sawyer
(74) *Attorney, Agent, or Firm* — Sage Patent Group (57) ABSTRACT

The present disclosure relates to a condenser bushing including a condenser core and electrically conductive field-grading layers, which are embedded in insulating material of the condenser core and arranged around a central channel for conductor extending along an axis defining an axial direction, while an electric connection is provided to at least one of the field-grading layers, wherein pairs of neighbouring field-grading layers with the insulation material between them form sections of the condenser core of axial lengths $L_1$ through $L_n$ and with capacitances $C_1$ through $C_n$, characterized in that a shape of at least one of the field-grading layers deviates from cylindricality in order to reduce non-uniformity of electric field stress of the condenser bushing com- (Continued)

pared to a corresponding condenser bushing with the cylindrical field-grading layers forming sections of the axial lengths $L_1$ through $L_n$ and with capacitances $C_1$ through $C_n$.

16 Claims, 6 Drawing Sheets

(51) Int. Cl.
    *H01G 4/35*     (2006.01)
    *H01B 17/28*     (2006.01)
    *H01G 4/32*     (2006.01)

(56) References Cited

U.S. PATENT DOCUMENTS

| | | | | |
|---|---|---|---|---|
| 3,646,251 A | * | 2/1972 | Friedrich | H01B 17/28 174/142 |
| 3,654,524 A | * | 4/1972 | Puppolo | H01G 9/08 361/515 |
| 4,227,035 A | * | 10/1980 | Runnels | H01B 17/36 174/31 R |
| 4,370,514 A | | 1/1983 | Matthaus | |
| 4,387,266 A | | 6/1983 | Matthaus | |
| 2019/0311822 A1 | | 10/2019 | Perigo et al. | |
| 2019/0389126 A1 | | 12/2019 | Martini et al. | |
| 2022/0006208 A1 | * | 1/2022 | Edberg | H01G 4/40 |

FOREIGN PATENT DOCUMENTS

| | | |
|---|---|---|
| CN | 206195161 U | 5/2017 |
| DE | 453130 C | 11/1927 |
| EP | 0085966 A1 | 8/1983 |
| GB | 339227 A | 12/1930 |
| GB | 953642 A | 3/1964 |
| WO | 8000762 A1 | 4/1980 |
| WO | 2008112819 A2 | 9/2008 |

OTHER PUBLICATIONS

Government of India Examination Report, Indian Application No. 202247037053, mailed Dec. 10, 2022, 6 pages.

International Search Report and Written Opinion of the International Searching Authority, PCT/EP2020/087675, mailed Feb. 24, 2021, 15 pages.

Extended European Search Report mailed Jun. 15, 2020 for European Patent Application No. 19220097.0, 9 pages.

Chinese Office Action and Search Report, Chinese Patent Application No. 2025052800083510, mailed May 28, 2025, 11 pages.

* cited by examiner

Fig. 1

(prior art)

CONDENSER BUSHING

CROSS REFERENCE TO RELATED APPLICATIONS

This application is a 35 U.S.C. § 371 national stage application of PCT International Application No. PCT/EP2020/087675 filed on Dec. 22, 2020, which in turn claims foreign priority to European Patent Application No. 19220097.0, filed on Dec. 30, 2019, the disclosures and content of which are incorporated by reference herein in their entirety.

TECHNICAL FIELD

The subject of the disclosure is a condenser bushing applicable in electric power engineering.

BACKGROUND ART

A high voltage bushing is a component that is mainly used to carry current at high electric potential from an active part of a first high voltage component, such as a transformer, a generator or a circuit breaker, through a barrier, like the grounded housing of the first component, to a second high voltage component, such as a high voltage overhead line or a high voltage cable termination. Such a high voltage bushing is used in switchgear installations (such as gas-insulated switchgear, GIS or air-insulated switchgear, AIS), power or distribution transformers, or in high voltage rotating machines like generators, for voltage levels ranging from a few kV up to several hundred kV and above 1000 kV. In order to decrease and control the electric field, the high voltage bushing comprises a condenser core, which facilitates electric-field stress control. Condenser bushing can also be used as a part of a high-voltage insulation system of an instrument transformer or a cable termination.

Figure 1:
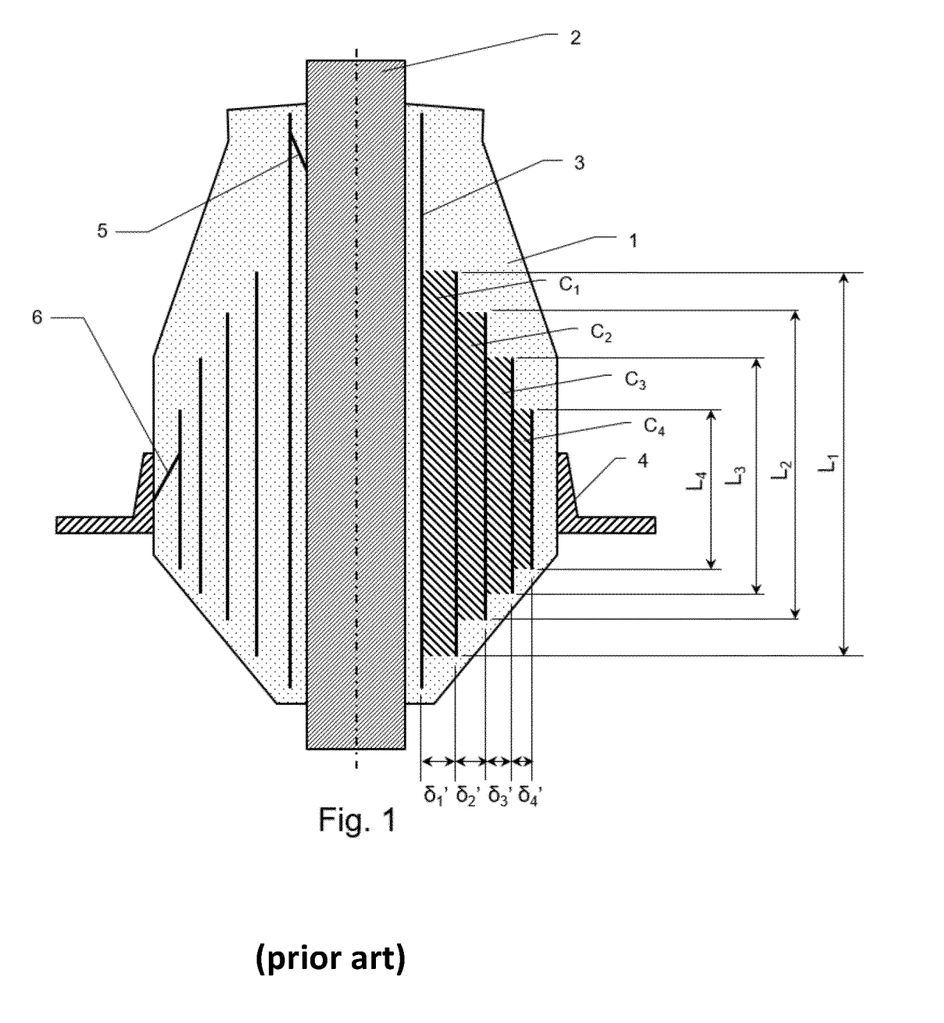
FIG. 1—prior art condenser bushing,
  FIG. 2—first embodiment,
  FIG. 3—second embodiment,
  FIGS. 4 and 5—condenser bushing comprising potential connections,
  FIG. 6—condenser bushing comprising insulation material surface following field-grading layer edges

A typical condenser bushing for medium- or high-voltage applications, as shown in FIG. 1, comprises a condenser core (1) with a number of concentric electrically conducting field-grading layers (3) of cylindrical shape arranged around the central conductor (2) embedded in the insulation material of the condenser core (1). The innermost field-grading layer of the condenser core of a bushing is electrically connected to the conductor of the bushing via a high-voltage connection (5). The outermost, and/or one of the other outer field-grading layers are electrically connected to the ground potential via a ground connection (6). Connection to the ground potential goes typically via the metallic flange (4) which serves to mechanically fix the bushing to the grounded equipment. The field-grading layers (3) with the insulation material between them form a capacitive divider distributing the total voltage U applied to the condenser core among the field-grading layers in fixed and defined portions $U_i$. Each pair of neighbouring field-grading layers (3) with the insulation material between them forms a section of the condenser core with a capacitance $C_i$. Each voltage portion $U_i$ is proportional to the inverse of the section capacitance, $1/C_i$, and the sum of the portions add to the total voltage U. As a result, the electric field generated by the high voltage is distributed in a controlled way, both inside the condenser core in the radial direction (radial field stress), and outside, close to the outer surface of the bushing, along its axis (axial field stress). The condenser core shown in FIG. 1 has four sections, in general an arbitrary number n of sections can be applied.

Condenser bushings of today are usually manufactured by winding a spacer material on a mandrel or conductor and inserting electrically conductive field-grading layers (foils) in between the wound layers of the spacer material. Alternatively, the field-grading layers are printed using an electrically conductive ink directly on the surface of the spacer material. Afterwards the structure is impregnated by hardenable resin which is subsequently hardened. This method allows for producing field-grading layers of cylindrical shape only. However additive manufacturing methods allow to improve the features of the condenser bushings.

One problem to be solved is to lower the diameter of a condenser bushing.

Another problem are potential connections of the field-grading layers, each of which consists of a piece of conductor glued to the layer using an electrically conductive adhesive. The construction of such a connection is complex, prone to errors in manufacturing and makes a relatively high inductance.

Still another problem is an electric field enhancement at the surface of the condenser core due to the sharp edges of the field grading layers which are close to the surface. To minimize this enhancement there is a need of a thick overbuild layer of the insulating material covering the edges of the field-grading layers all over the axial distance adjacent to the edges. This overbuild thickness has to be even larger because of the typical wide tolerance of both radial and axial positions of the foils in the manufacturing process of the condenser core.

SUMMARY

A condenser bushing with cylindrical field-grading layers (foils) is shown in FIG. 1. In order to generate possibly uniform grading of the electric field in both the axial and the radial directions the layer spacing $\delta_1'$ through $\delta_n'$ of all the sections and the axial lengths of the sections $L_1$ through $L_n$ have to be adjusted accordingly. For example, they are adjusted so that the capacitances of the thus formed sections of the condenser core, $C_1$ through $C_n$, are equal. This leads to an equal voltage division through the sections of the condenser core and, when the axial lengths of the sections are linearly distributed, to a substantially uniform axial field stress of all sections. Then, however the layer spacing distances $\delta_i'$ are typically not equal, and so are the field stress values in the radial direction between the foils, which are the ratios of the section voltage $U_i$ and the layer spacing distance $\delta_i'$. This implies that only one or two sections can be stressed to a maximal allowable value. The other sections are under-stressed, which means that the diameter of the condenser core is larger than a possible optimal value. This issue concentrates at the sharp edges at the axial ends of the layers, which locally enhance the field stress and make the field in each single section highly non-uniform over the distance between the edge of the foil and the neighbouring foil of the section. Because of this non-uniformity the region of the edge of the foil is the most prone to electric breakdown between the layers. To avoid such a breakdown the condenser core has to be designed so that, for each section, the ratio of the voltage $U_i$ of the section and the radial width of the section at its end, i.e. at the edge of the axially shorter layer of the section, is smaller than a defined safe design limit value. This ratio will be referred to as a mean edge field stress throughout the description of the disclosure. For a condenser core with cylindrical layers the radial section width at the layer edge, i.e. at the axial end of the section, is equal to the layer spacing $\delta_i'$ but generally it does not need to be so and throughout the description of the disclosure we shall use the designation $\delta_i'$ or $\delta_i$ to denote the radial width of the section at its axial end. Generally, this width can be different at both axial ends of the section; in the description we discuss one end only, but the disclosure relates equivalently to the second end. The safe design value of the mean edge field stress is strongly limited due to the sharp edges of the layers, this imposes designs with relatively large $\delta_i'$, and thus with relatively large overall diameter of the bushing.

Use of the additive manufacturing techniques, in which the insulating material forming the condenser core and the conductive material forming the field-grading layers can be deposited in a controlled way over defined locations of the build-up surface of the manufactured condenser core, layer by layer, allows to solve the problems of not equal stressing of all sections and of the strong limitation of the mean edge field stress by providing a condenser core of a bushing with non-cylindrical, curved field-grading layers. In this way, additive manufacturing allows for optimization of the field stress distribution in a condenser core leading to a possibility of reducing its diameter and consequently for reduction in material usage, processing time, and cost of the component.

In one example the field-grading layers are shaped so that the differences between the mean edge field stress values of the sections are reduced, or that all the mean edge field stress values are made equal. For example, one of the field-grading layers, forming a section which in an optimized design with cylindrical layers is stressed the most, reaching the safe design limit value, is shaped so that the layer spacing of the section is maintained over the majority of the layer surface area but in the regions close to the edge of the second of the layers forming the section the distance between the layers is increased. In this way the voltage of the section is substantially unchanged, but the mean edge field stress of that section is decreased. At the same time the mean edge field stress of an adjacent section is increased, but so that it does not reach the safe design limit. This change allows for proportionally decreasing of all the layer spacing distances of the condenser core and thus reducing its overall diameter, until the maximal mean edge field stress reaches again the safe design limit value. Optimization of all the layers in such a manner can also lead to making the mean edge field stress substantially equal for all sections, thus allowing for a significant reduction of the overall diameter of the condenser core.

In another example the edges of the field-grading layers are bent outwards so that the concentration of the electric field is reduced at the axial ends of the section and the field stress value over the path between the layers in the vicinity of the edges is made more uniform. With the more uniform field stress the breakdown voltage of the section becomes larger and thus also the safe design limit of the mean edge field stress value can be set at a higher point. This allows for a significant reduction of the layer spacing distance and thus for a reduction of the overall diameter of the condenser core.

Additionally, the additive manufacturing techniques can provide potential connections being an integral part of the field-grading layers, made in substantially axially symmetric shape, with the conductive material volume reaching from the layer to the outer or to the inner surface of the condenser core. This simplifies the construction of the connection in that a smaller number of components is used and in that it does not require additional manufacturing procedures compared to those used to produce the insulation and the field-grading layers of the core. This makes also the inductance of the connections significantly smaller compared to a connection made at one point with a piece of wire.

Moreover, use of the additive manufacturing techniques allows to shape an outer surface of the condenser core in such a way that the insulating material overbuild thickness over the edges of the field-grading layers is made larger than in the sections between the edges. Contrary to the spacer-winding-impregnation-and-curing manufacturing techniques of today, the additive manufacturing allows for precise synchronization of the positions of the edges of the layers and of the protruding parts of the outer shape of the condenser core. Thus, the problem of an electric field enhancement at the surface of the condenser core can be solved with using a minimum amount of the insulating material, which is applied only there where it is needed to reduce the field at the surface.

The present disclosure relates to a condenser bushing comprising a condenser core (1) and electrically conductive field-grading layers (3), which are embedded in insulating material of the condenser core (1) and arranged around a central channel for conductor (2) extending along an axis defining an axial direction, while an electric connection (6) is provided to at least one of the field-grading layers (3), wherein pairs of neighbouring field-grading layers (3) with the insulation material between them form sections of the condenser core of axial lengths $L_1$ through $L_n$ and with capacitances $C_1$ through $C_n$, wherein a shape of at least one of the field-grading layers (3) deviates from cylindricality in order to reduce non-uniformity of electric field stress of the condenser bushing compared to a corresponding condenser bushing with the cylindrical field-grading layers forming sections of the axial lengths $L_1$ through $L_n$ and with capacitances $C_1$ through $C_n$, wherein at least one of the field-grading layers (3) is shaped such that the diameter of said field-grading layer (3) varies along the axial direction, characterized in that the diameter of said field grading layer (3) has at least one maximum between the edges of the field-grading layer (3).

The condenser bushing may further comprise any of below features or their technically feasible combinations:
  at least one of the field-grading layers (3) is shaped such that the diameter of said field-grading layer varies along the axial direction;
  the diameter of the field-grading layer (3) has at least one maximum between the edges of the field-grading layer (3);
  the mean edge field stress level, defined as the ratio of the voltage $U_i$ of the section and the radial width $\delta_i$ of the section at its end, i.e. at the edge of the axially shorter field-grading layer of the section, in at least one section formed by a non-cylindrical field-grading layer is smaller than in the corresponding section of a condenser bushing with cylindrical field-grading layers forming sections of identical capacitances $C_1$ through $C_n$ and identical axial lengths $L_1$ through $L_n$;
  the absolute value of $$\left(\frac{U_i}{\delta i}\bigg/\frac{U_j}{\delta j} - 1\right)$$

is at least 20% smaller than the absolute value of $$\left(\frac{U_i}{\delta_i'}\bigg/\frac{U_j}{\delta_j'} - 1\right).$$

where $$\frac{U_i}{\delta i} \text{ and } \frac{U_j}{\delta j}$$

are the mean edge field stress levels of two neighbouring sections, wherein at least one section is formed by a non-cylindrical field-grading layer and $$\frac{U_i}{\delta'_i} \text{ and } \frac{U_j}{\delta'_j}$$

are the mean edge field stress levels of two corresponding neighbouring sections the corresponding condenser bushing with the cylindrical field-grading layers;
  the radial widths of the sections at their axial ends are substantially equal;
  the innermost and/or the outermost field-grading layer is cylindrical;
  the capacitances of all the sections formed by the field-grading layers (3) are equal;
  at least one edge of at least one of the field-grading layers (3) is bent outwards with respect to the axis;
  the radius of curvature of the bent edge of the field-grading layer is equal to at least three, preferably at least five, layer thicknesses;
  at least one potential connection (5, 6, 7) is an integral part of a field-grading layer (3) and has a substantially axially symmetric shape, with the conductive material volume reaching from the field-grading layer to the outer or inner surface of the condenser core (1);
  the condenser core (1) is shaped in such a way that the thickness of an insulating material between each of the edges of adjacent field-grading layers (3) and the outer surface of the condenser core (1) is greater than the thickness of an insulating material between the middle point between the edges of the adjacent field-grading layers (3) and the outer surface of the condenser core (1).

The present disclosure relates also to a use of an additive manufacturing method to manufacture the condenser bushing.

BRIEF DESCRIPTION OF DRAWINGS

Condenser bushing is depicted in exemplary embodiments, wherein figures present in a cross section.

DETAILED DESCRIPTION

Figure 2:
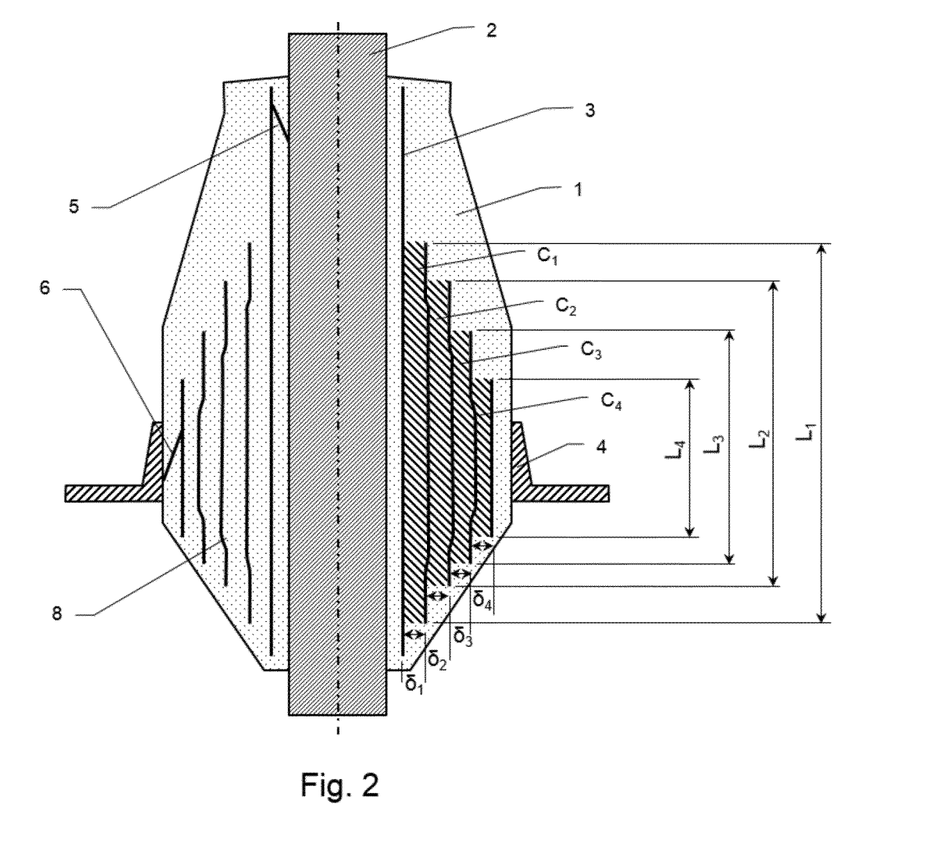

Manufacturing of a bushing using additive manufacturing methods allows for manufacturing the field-grading layers (3) of an arbitrary shape. An example of such a bushing is shown in FIG. 2. In this embodiment the field-grading layers are shaped so that the radial width of all sections at their ends, $\delta_i$, are equal. The innermost and the outermost layers are cylindrical. The other layers are shaped so that the capacitances of all the sections are also equal. This makes the mean edge field stress values of all the sections equal, all reaching the safe design limit, and allows for making the overall diameter of the condenser core significantly smaller than in an equivalent design with cylindrical layers in which the mean edge field stress value reaches the safe design limit only in one or two sections.

In the design shown in the drawing, the equivalent grading system formed by cylindrical field-grading layers, having all sections of the same capacitances $C_1$ through $C_4$ and the same axial lengths of the layers $L_1$ through $L_4$, the section $C_4$ would be the only one with the mean edge field stress level reaching the safe design limit. In the grading system, by non-cylindrical shaping of the inner layer of the section $C_4$, the edge width $\delta_4$ of that section is increased compared to the cylindrical design. In that way, the mean edge field stress level of this section is reduced and the radial dimension of the set of all layers can be proportionally scaled down to a smaller diameter, bringing back the mean edge field stress value of the section $C_4$ to the safe design limit. In such a way the diameter of the condenser core can be made smaller than that of the one made according to known art. The diameter of the field-grading layer (3) has at least one maximum between the edges of the field-grading layer (3). Therefore, a capacitance between adjacent field-grading layers (3) can be altered by adjusting the position, the width or the amplitude of the maximum of each of field grading layer (3). In this way the distance between adjacent field-grading layers, and thereby also the capacitance and the mean edge field stress, can be adapted. As the maximum of the field-grading layer (3) reduces the distance of between adjacent field-grading layers (3) a stronger electric field is stored at the maximum, hence, reducing the electric field strength at the edges. In the embodiment shown in FIG. 2 the maximums of the field-grading layers (3) have been designed such that the maximums of the field-grading layers (3) become bigger in amplitude, but narrower in width, with increasing distance from the condenser core (1). In the example in FIG. 2 all the layers are optimized in the described way, bringing the mean edge field stress to an equal value in all the sections and providing a significant reduction of the diameter compared to the design with cylindrical layers.

Figure 3:
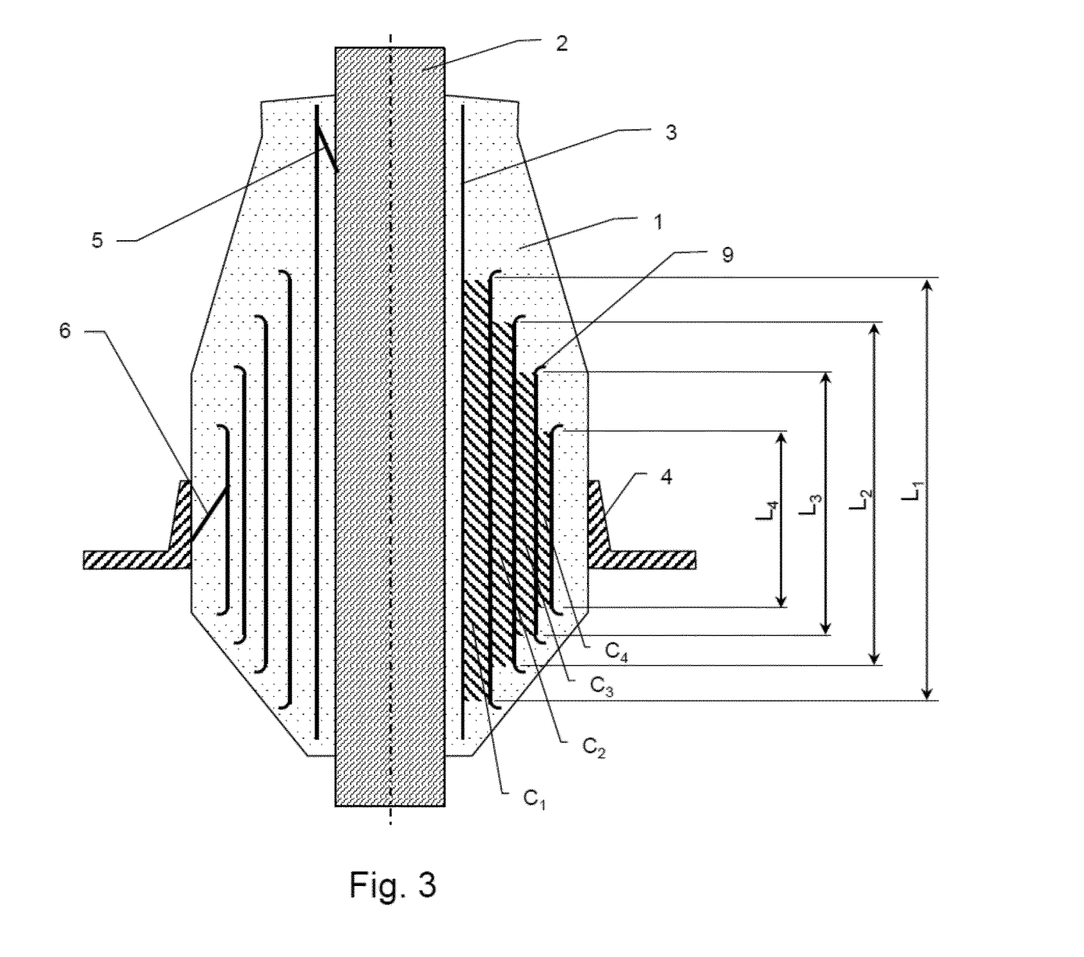

Another embodiment is shown in FIG. 3. The edges of the field-grading layers are bent outwards thus reducing the electric field stress close to the edges, making the field stress more uniform over the distance between the layers at the end of the section and allowing for setting the safe design limit of the mean edge field stress level at a higher value compared to a condenser core with cylindrical layers.

Figure 4:
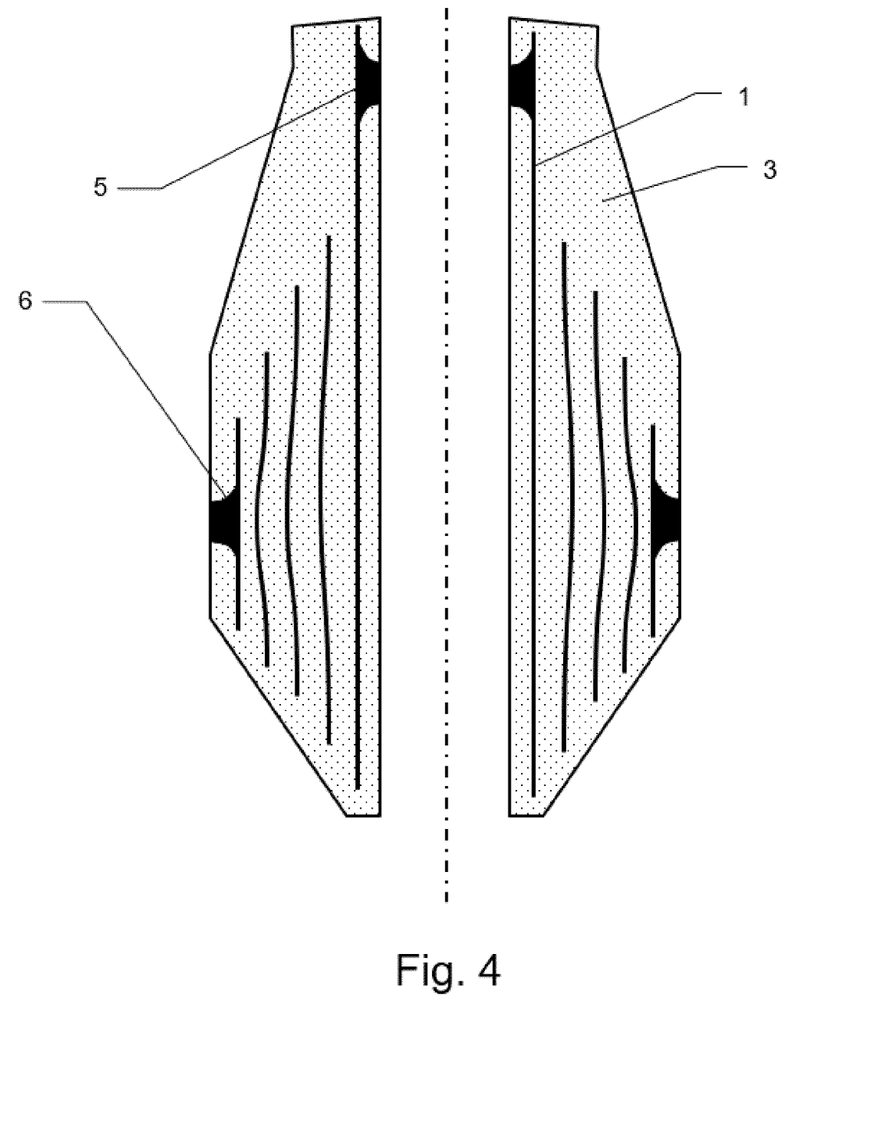
Figure 5:
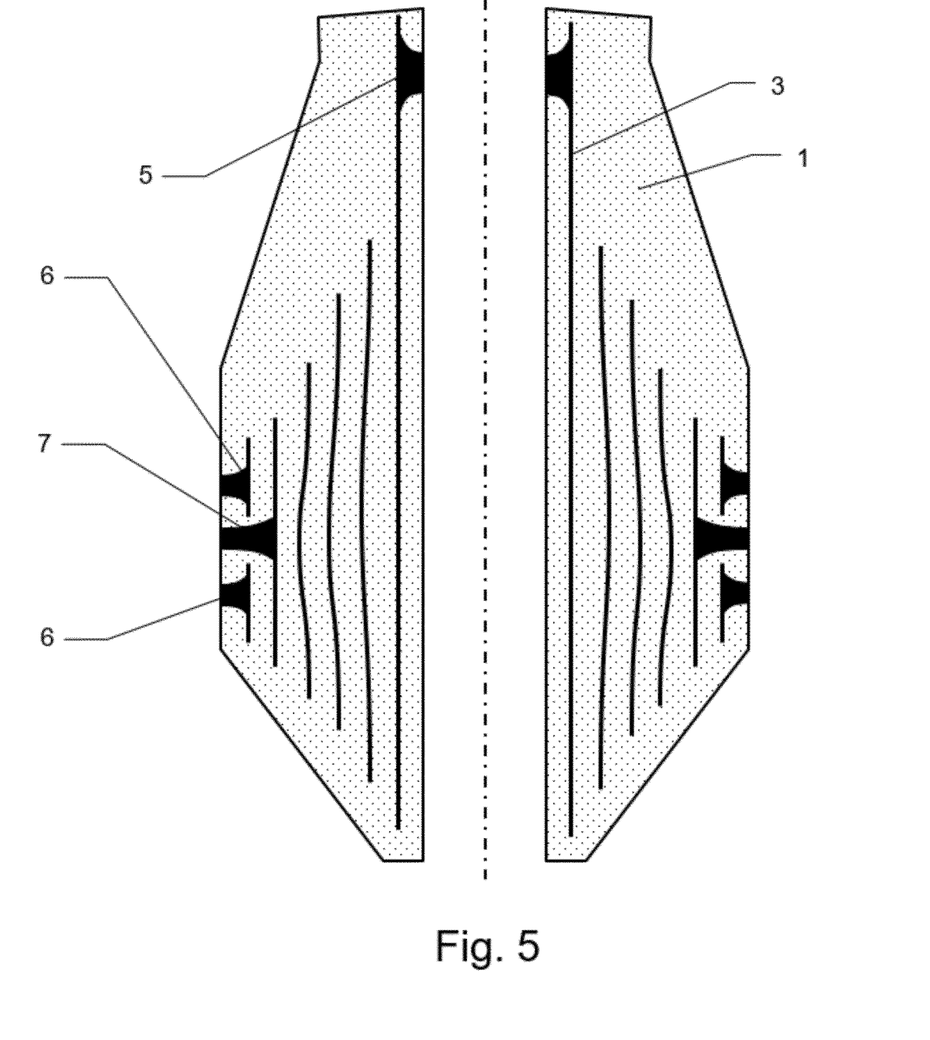

FIGS. 4 and 5 show the potential connections, high-voltage (5), ground (6), and voltage-tap (7), made in a form of an axially symmetric bulk conductive material objects, produced in an additive manufacturing process in parallel with the insulation material of the condenser core. The diameter of the inner field-grading layers (3) have a maximum between the edges of the field-grading layer (3). Hence, the electric field is accumulated at the maximums and the electric field at the edges of the field-grading layers (3) is reduced. The capacitance between field-grading layers is adjusted and levelled by forming the maximums accordingly.

Figure 6:
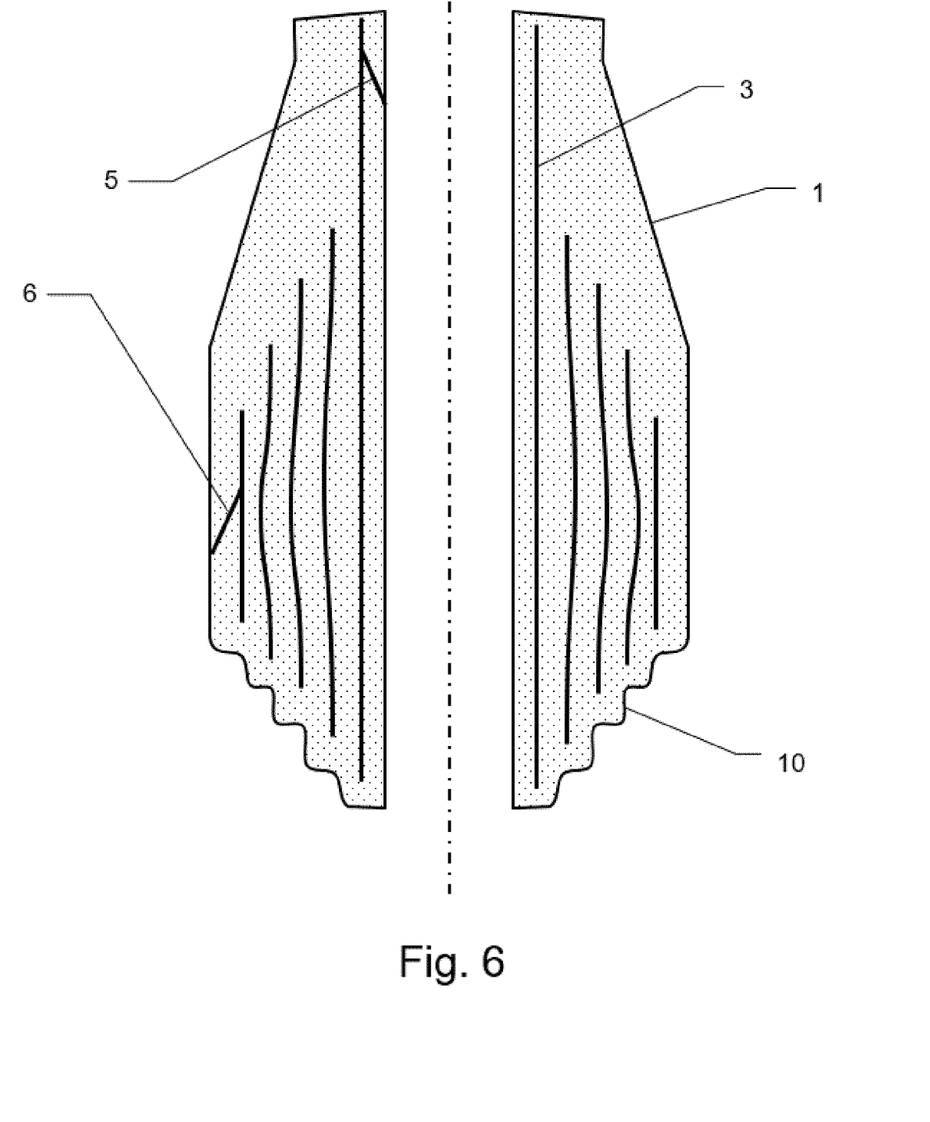

FIG. 6 shows the shape of the condenser core (1) with its outer surface following the edges of the field-grading layers (3). The insulation material thickness is enlarged close to the edges of the layers. The surface of the condenser core (1) is stepped such that the thickness of the insulating material between the each of the edges of adjacent field-grading layers (3) and the outer surface of the condenser core (1) is greater than the thickness of an insulating material between the middle point between the edges of the field-grading layers (3) and the outer surface of the condenser core (1). Hence, the corner of step-shaped outer surface of the condenser core (1) is positioned at a level between adjacent field-grading layers (3). In this way excessive electric fields between the edge of the field-grading layers (3) and the outer surface of the condenser core (1) are omitted. Both the insulation material and the conductive layers can be made in an additive manufacturing process allowing for a precise correlation of the positions of the layers and the positions of the protruding parts of the insulating material.

Potential connection (5, 6, 7) are suitable also for other types of condenser bushing, for example for a condenser bushing with a cylindrical field-grading layers. Therefore a present disclosure relates also to a condenser bushing comprising a condenser core (1) and electrically conductive field-grading layers (3) which are embedded in insulating material of the condenser core (1) and arranged around a central channel for conductor (2) extending along an axis defining an axial direction, while an electric potential connection (6) is provided to at least one layer of the field-grading layers (3), the connection being an integral part of a field-grading layer (3) and having a substantially axially symmetric shape, with the conductive material volume reaching from the field-grading layer to the outer or inner surface of the condenser core (1).

The same applies to the outer surface following the edges of the field-grading layers (3). The present disclosure relates also to a condenser bushing comprising a condenser core (1) and electrically conductive field-grading layers (3) which are embedded in insulating material of the condenser core (1) and arranged around a central channel for conductor (2) extending along an axis defining an axial direction, while an electric potential connection (6) is provided to at least one layer of the field-grading layers (3), wherein the condenser core (1) is shaped in such a way that the thickness of an insulating material between the edges of the field-grading layers (3) and the outer surface of the condenser core (1) is greater than the thickness of an insulating material between the section between the edges of the field-grading layers (3) and the outer surface of the condenser core (1).

REFERENCE NUMBERS LIST

1—condenser core
2—conductor
3—field-grading layers
4—flange
5—high-voltage connection
6—ground connection
7—voltage tap connection
8—curvature of field-grading layer
9—edges of field-grading layers bent outwards
10—curvature of outer surface of condenser core, where the insulation material surface follows the field-grading layer edges

The invention claimed is:

1. A condenser bushing comprising:
a condenser core and electrically conductive field-grading layers, which are embedded in insulating material of the condenser core and arranged around a central channel for a conductor extending along an axis defining an axial direction, an electric connection being provided to at least one of the field-grading layers, pairs of neighbouring field-grading layers with the insulation material between them forming sections of the condenser core of axial lengths $L_1$ through $L_n$ and with capacitances $C_1$ through $C_n$,
a shape of at least one of the field-grading layers deviating from cylindricality to reduce non-uniformity of electric field stress of the condenser bushing compared to a corresponding condenser bushing with the cylindrical field-grading layers forming corresponding sections of the axial lengths $L_1$ through $L_n$ and with capacitances $C_1$ through $C_n$, and
at least one of the field-grading layers being shaped such that the diameter of said field-grading layer varies along the axial direction, the diameter of said field grading layer having at least one maximum between the edges of the field-grading layer, wherein the maximums of the field-grading layers increase in amplitude along a radial direction, but narrower in width along the axial direction, with increasing distance from the condenser core, wherein the terminating ends of each of the field-grading layers are straight in the axial direction.

2. The condenser bushing according to claim 1, wherein the mean edge field stress level, defined as the ratio of the voltage $U_i$ of one of the sections and the radial width $\delta_i$ of the section at its end in at least one section formed by a non-cylindrical field-grading layer is smaller than in the corresponding section of a condenser bushing with cylindrical field-grading layers forming sections of identical capacitances $C_1$ through $C_n$ and identical axial lengths $L_1$ through $L_n$.

3. The condenser bushing according to claim 2, wherein the absolute value of $$\left(\frac{U_i}{\delta i} / \frac{U_j}{\delta j} - 1\right)$$

is at least 20% smaller than the absolute value of $$\left(\frac{U_i}{\delta'_i} / \frac{U_j}{\delta'_j} - 1\right),$$

where $$\frac{U_i}{\delta i} \text{ and}$$

are the mean edge field stress levels of two neighbouring sections, wherein at least one section is formed by a non-cylindrical field-grading layer and $$\frac{U_i}{\delta'_i} \text{ and } \frac{U_j}{\delta'_j}$$

are the mean edge field stress levels of two corresponding neighbouring sections the corresponding condenser bushing with the cylindrical field-grading layers.

4. The condenser bushing according to claim 1, wherein the radial widths of the sections at their axial ends are substantially equal.

5. The condenser bushing according to claim 1, wherein the innermost and/or the outermost field-grading layer is cylindrical.

6. The condenser bushing according to claim 1, wherein the capacitances of all the sections formed by the field-grading layers are equal.

7. The condenser bushing according to claim 1, wherein at least one of a ground connection, the electrical connection, and/or a voltage-tap connection is an integral part of a field-grading layer and has a substantially axially symmetric shape, with a conductive material volume reaching from the field-grading layer to the outer or inner surface of the condenser core.

8. The condenser bushing according to claim 1, wherein the condenser core is shaped in such a way that the thickness of an insulating material between the each of the edges of adjacent field-grading layers and the outer surface of the condenser core is greater than the thickness of an insulating material between the middle point between the edges of the field-grading layers and the outer surface of the condenser core.

9. An additive manufacturing method to manufacture the condenser bushing according to claim 1.

10. An electrical insulation system comprising:
an active part comprising a conductor;
a condenser bushing disposed around the conductor, the condenser bushing comprising:
  a condenser core and electrically conductive field-grading layers, which are embedded in insulating material of the condenser core and arranged around a central channel for a conductor extending along an axis defining an axial direction, an electric connection being provided to at least one of the field-grading layers,
  pairs of neighbouring field-grading layers with the insulation material between them forming sections of the condenser core of axial lengths $L_1$ through $L_n$ and with capacitances $C_1$ through $C_n$,
  a shape of at least one of the field-grading layers deviating from cylindricality to reduce non-uniformity of electric field stress of the condenser bushing compared to a corresponding condenser bushing with the cylindrical field-grading layers forming corresponding sections of the axial lengths $L_1$ through $L_n$ and with capacitances $C_1$ through $C_n$, and
at least one of the field-grading layers being shaped such that the diameter of said field-grading layer varies along the axial direction, the diameter of said field grading layer having at least one maximum between the edges of the field-grading layer, wherein the maximums of the field-grading layers increase in amplitude along a radial direction, but narrower in width along the axial direction, with increasing distance from the condenser core, wherein the terminating ends of each of the field-grading layers are straight in the axial direction.

11. The electrical insulation system according to claim 10, wherein the active part is part of a high voltage component of one of a transformer, a generator, and a circuit breaker.

12. The electrical insulation system according to claim 10, wherein the mean edge field stress level, defined as the ratio of the voltage $U_i$ of the section and the radial width $\delta_i$ of the section at its end in at least one section formed by a non-cylindrical field-grading layer is smaller than in the corresponding section of a condenser bushing with cylindrical field-grading layers forming sections of identical capacitances $C_1$ through $C_n$ and identical axial lengths $L_1$ through $L_n$.

13. The electrical insulation system according to claim 11, wherein the absolute value of $$\left(\frac{U_i}{\delta i}/\frac{U_j}{\delta j} - 1\right)$$

is at least 20% smaller than the absolute value of wherein the absolute value of $$\left(\frac{U_i}{\delta'_i}/\frac{U_j}{\delta'_j} - 1\right),$$

where $$\frac{U_i}{\delta i} \text{ and } \frac{U_j}{\delta j}$$

are the mean edge field stress levels of two neighbouring sections, wherein at least one section is formed by a non-cylindrical field-grading layer and $$\frac{U_i}{\delta'_i} \text{ and } \frac{U_j}{\delta'_j}$$

are the mean edge field stress levels of two corresponding neighbouring sections the corresponding condenser bushing with the cylindrical field-grading layers.

14. The electrical insulation system according to claim 10, wherein the radial widths of the sections at their axial ends are substantially equal.

15. The electrical insulation system according to claim 10, wherein the innermost and/or the outermost field-grading layer is cylindrical.

16. The electrical insulation system according to claim 10, wherein the capacitances of all the sections formed by the field-grading layers are equal.

* * * * *